(12) United States Patent
Midali et al.

(10) Patent No.: US 8,573,575 B2
(45) Date of Patent: Nov. 5, 2013

(54) REFERENCE TOOL FOR ASSEMBLY JIG FOR AIRCRAFT STRUCTURES

(75) Inventors: Alberto Midali, Sesto Calende (IT); Agnellini Elio, Suno (IT)

(73) Assignee: Alenia Aermacchi S.p.A., Venegono Superiore (VA) (IT)

( * ) Notice: Subject to any disclaimer, the term of this patent is extended or adjusted under 35 U.S.C. 154(b) by 300 days.

(21) Appl. No.: 13/069,041

(22) Filed: Mar. 22, 2011

(65) Prior Publication Data

US 2011/0226073 A1    Sep. 22, 2011

(30) Foreign Application Priority Data

Mar. 22, 2010   (IT) .............................. TO2010A0219

(51) Int. Cl.
    *B23Q 1/25*      (2006.01)
(52) U.S. Cl.
    USPC ........................................... 269/47

(58) Field of Classification Search
    None
    See application file for complete search history.

(56) References Cited

U.S. PATENT DOCUMENTS

| 3,003,657 | A | * | 10/1961 | Siebel et al. ............. 29/243.521 |
| 4,401,311 | A | * | 8/1983 | Almeraz ....................... 280/843 |
| 2004/0206713 | A1 | * | 10/2004 | Lloyd et al. ................... 211/113 |
| 2011/0100665 | A1 | * | 5/2011 | Nakashima ................ 173/162.2 |
| 2011/0227266 | A1 | * | 9/2011 | Midali et al. .................... 269/47 |

FOREIGN PATENT DOCUMENTS

WO    WO 03/037564    5/2003

\* cited by examiner

*Primary Examiner* — Robert R Raevis
(74) *Attorney, Agent, or Firm* — Merchant & Gould P.C.

(57) ABSTRACT

A reference tool for assembly jigs for aircraft structures includes a constraint pin (1), for being inserted into holes purposely provided on the assembly jig for aircraft structures and a reference support (2), associated with the pin, for generating a gap between the parts of the aircraft structure, during assemblage, of a known and standardized amount.

8 Claims, 1 Drawing Sheet

REFERENCE TOOL FOR ASSEMBLY JIG FOR AIRCRAFT STRUCTURES

This application claims benefit of Serial No. TO 2010 A 000219, filed 22 Mar. 2010 in Italy and which application is incorporated herein by reference. To the extent appropriate, a claim of priority is made to the above disclosed application.

BACKGROUND

The present invention relates to reference tools for assembly jigs for aircraft structures.

Assembly jigs for aircraft structures are substantially frameworks that support the various parts of an aircraft during the stage of assembly of the aircraft itself. Said frameworks form seats for precise positioning of the various parts so as to favour proper constraint thereof to the other parts of the aircraft present in the framework. It is known that in a jig in which an aircraft or aircraft structure is housed both in the assembly step of jigs for aircraft structures and for inspections for setting-up and routine monitoring of the aircraft.

Said tools are generally made up of different parts that are made of materials different from one another, which entails different and distinct production steps.

The time employed for assembling the tool makes the cost of said device high; moreover, errors during the step of production or of assembly may not guarantee the reliability of the end product.

The parts that make up the tool, as has already been said, are made of different materials, which consequently causes an additional cost for use of systems for the production of each individual part.

Said parts are made via milling, turning, and drilling operations, which appear expensive and require a long time for their production.

To connect the single parts, during the assembly step of the complete probe, different types of connection members are necessary in the form of constraints, gluing, and fixing, which involve the use of different devices, with the consequent increase in costs and in the production time.

Joining of materials with different chemical properties can lead to problems caused by the different degrees of thermal expansion of the materials themselves, which can jeopardize their use and the precision or reliability of said devices. Furthermore, for reasons of cost and time, said tools are frequently reused by the operators even though they are damaged, leading to possible errors of tolerances in the subsequent assembly operations.

SUMMARY

The purpose of the present invention is to overcome said drawbacks by creating a new type of tools made of a single plastic material, thus enabling use of a single production process and a single production plant.

By means of the present invention, the production times due to assemblage and possible machining operations on the individual parts to obtain a reliable product are reduced. One aspect of the present invention relates to a reference tool for frameworks.

BRIEF DESCRIPTION OF THE DRAWINGS

The characteristics and advantages of the tools will emerge more clearly and evidently from the following description of an embodiment thereof, with reference to the attached figures, wherein specifically.

DETAILED DESCRIPTION

Figure 1:
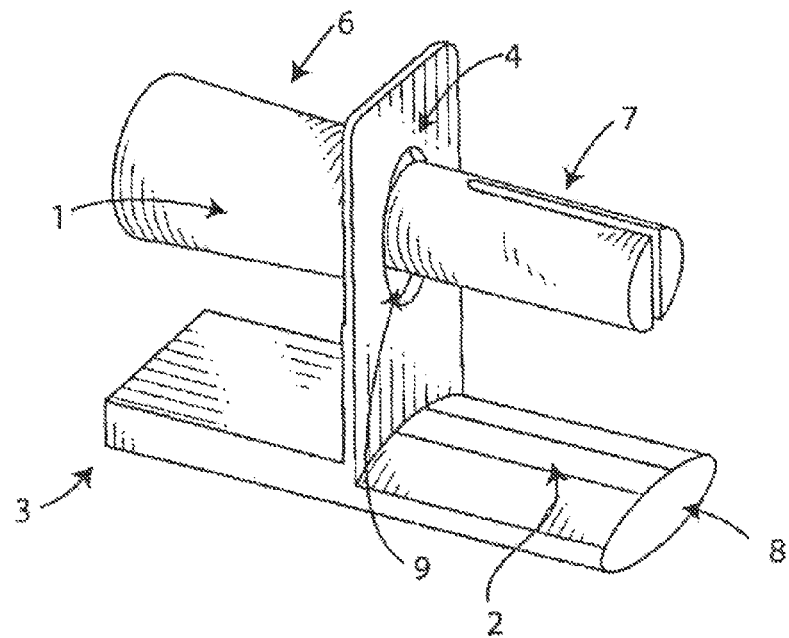
FIG. 1 illustrates the innovative reference tool for jigs.

With reference to the aforesaid figures, the reference tool for jigs according to the present invention comprises a constraint pin 1, which comprises a knob 6 and a pin 7, and a reference support 2, which is associated to said pin, adapted to generate a gap between the parts of the aircraft structure, during assemblage, having a known and standardized value.

In the embodiment illustrated, constraint pin 1 is adapted to be inserted into purposely provided holes provided on the assembly jig for the aircraft, knob 6 is adapted to favour gripping, and pin 7 is adapted to be inserted into said holes.

Knob 6 has a tapered cylindrical shape, adapted to guarantee adequate gripping.

Provided in said knob 6 is a through hole 10 having a first portion of larger diameter 18, positioned in the part in which knob 6 has a larger outer diameter, and a second portion of smaller diameter 17, thus generating a step 11. Pin 7 comprises a first portion 12 of a cylindrical shape, adapted to be inserted into the purposely provided holes, a second portion 13 of a cylindrical shape, with diameter and length such as to enable insertion in second portion 17 of the hole of the knob, a head 14 of a cylindrical shape preferably tapered with trapezoidal cross section, comprising a slit 16, adapted to enable restriction of the diameter of said head and facilitate insertion of pin 7 in knob 6.

To provide said constraint pin 1 it is necessary to insert pin 7 in knob 6 in such a way that head 14, once it has got over step 11, can relax and guarantee blocking between the two parts since the diameter of head 14 is greater than the diameter of hole 10 in second portion 17.

Once constraint pin 1 and reference 2 have been assembled, it is possible to encounter a slight clearance, which is useful for rendering constraint 1 floating with respect to reference 2 via slot 9 in lamina 4.

Said method of blocking the two parts is very fast, reliable and convenient since, according to the known art, said pin is made of metal and requires a fixing between the two parts via a thread, thus leading to an increase both in the production times and in the costs, given that it is necessary to create a very precise thread on the parts of constraint pin 1 to guarantee perfect assembly with reference support 2 and not cause undesirable blocking between the two constituent parts of the tool.

Figure 2:
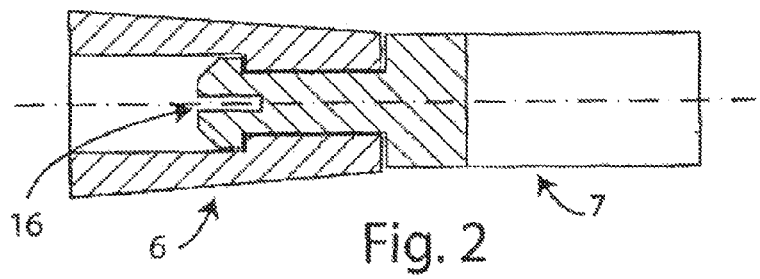
FIG. 2 illustrates the constraint pin of FIG. 1 shown in cross section with the corresponding constituent parts appearing clearly.
Figures 3, 4:
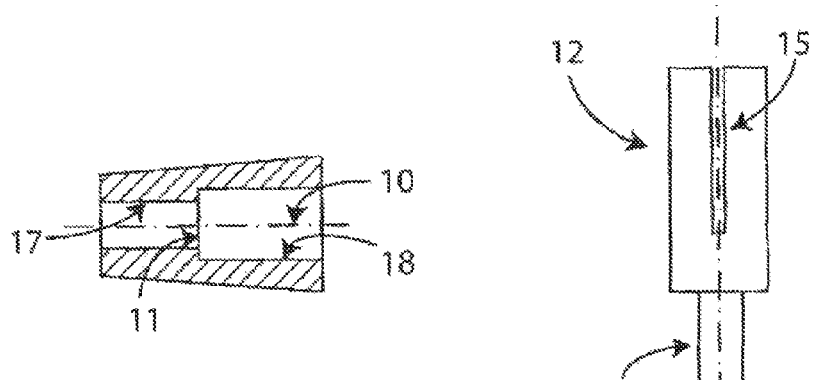
FIG. 3 illustrates a single body of FIG. 1 shown in projection.
FIG. 4 illustrates a reference tool for jigs of the known art.

Reference support 2 comprises a substantially rectangular flat portion 3, adapted to favour gripping of support 2, a shaped portion 8, adapted to be inserted between the parts of the aircraft structure that are to be assembled, and an elastic lamina 4, positioned perpendicular between the aforesaid two portions, thus creating a single structure with the possibility of variation of the angle between the axis of the constraint pin (FIG. 2) and the axis of reference surface 2.

Shaped portion 8 is adapted to create a gap of tolerance and has a shape such as to enable a transverse movement of the parts to be wired, guaranteeing that said reference support 2 can move, performing a brief rotation without any risk of failure or of the parts of the aircraft being assembled from clashing with one another, thus getting ruined.

Elastic lamina 4 comprises a slot 9 adapted to house constraint pin 1, of dimensions such as to guarantee a degree of freedom of movement for reference support 2, once constraint pin 1 is inserted in the purposely provided holes.

Said slot 9 enables movement of reference support 2 along the longitudinal axis of elastic lamina 4, always guaranteeing the right tolerance between the parts of the aircraft structure; moreover, it enables reference support 2 to turn through 360° about the axis of constraint pin 1, thus facilitating correct positioning of the reference support also on inclined surfaces.

Pin 7 comprises a longitudinal slit 15, adapted to facilitate insertion thereof in the purposely provided hole and an adequate force on the walls of the hole itself, adapted to guarantee stability and blocking of pin 1 in the hole.

Lamina 4 moreover performs a limit function for insertion of constraint pin 1 within the purposely provided hole, thus providing a reference for the operator on the correct insertion and positioning of the tool.

Said tool is made of thermoplastic material or equivalent materials and is obtained by injection-moulding production processes or else equivalent processes.

The dimensions of said tools, above all of the reference support, are standardized and vary according to the tolerance required in the positioning of the various parts during wiring and the dimensions of the parts themselves. From the foregoing description it is clear that constraint pin 1 is assembled directly on reference support 2, since pin 1, once assembled, can no longer be disassembled as a result of the method of closing that has just been described.

The main function of said flat portion 3 is to guarantee positioning and fixing of lamina 4.

According to the present invention reference support 2, and in particular flat portion 3, shaped portion 8, and lamina 4, are obtained in a single piece, thus eliminating the effective presence of a bracket for keeping the lamina in a vertical position, which is no longer necessary.

Once the step of assemblage of the aircraft structure on the jig is terminated, said tools are to be extracted by the operator to enable a definitive fixing between the parts, by pulling knob 6 of constraint pin 1.

To guarantee a good grip, flat portion 3 can be provided with knurling, or equivalent means obtained directly in the moulding step, or equivalent methods.

The fixing of the constraint pin in the hole can be alternatively obtained by making a thread both on pin 1 and in the hole since said pin 1 can turn within slot 9 of lamina 4.

If, during said operation of extraction or else in any preceding step, said tool undergoes damage, it can be replaced immediately with another tool similar in dimensions, since the cost for production of said tools is low, the times for production of new tools are very short, and hence it is possible to have available a large number of pre-produced spare tools.

With an injection-moulding production process it is possible to create tools with reference supports 2 and constraint pins 1 different from one another, for fixing particular parts of the aircraft that require different thicknesses and lengths of shaped portion 8, by adopting appropriate methods to enable relative movements between the various parts of said tool.

For the same purposes it is possible to provide tools with a plurality of shaped portions 8 and a single constraint pin 1.

The invention claimed is:

1. A reference tool for an assembly jig for an aircraft structure, comprising a constraint pin configured for being inserted into holes provided on the assembly jig for an aircraft structure, and a reference support, associated with said pin, for generating a standardized gap between parts of the aircraft structure, during assemblage;

said support comprising a flat portion configured for gripping of the support, a shaped portion configured for being inserted between the parts of the aircraft structure to be assembled, and an elastic lamina positioned perpendicular between the flat portion and the shaped portion, the elastic lamina connecting the support to the pin; the flat portion, the shaped portion, and the lamina of the support being made of a single body; and the pin and the support being made of similar materials.

2. The tool according to claim 1, wherein the elastic lamina, the flat portion, and the support are obtained jointly with a single production process.

3. The tool according to claim 1, wherein the constraint pin comprises a knob configured for gripping, and a pin configured for being inserted in said holes of the jig or of the aircraft structure.

4. The tool according to claim 3, wherein the knob and the pin are blocked via a pin with elastic interference, which enables assembly but not disassembly.

5. The tool according to claim 1, wherein the tool comprises thermoplastic material.

6. The reference tool according to claim 1, wherein the tool is made by a process of injection molding.

7. The tool according to claim 1, wherein the elastic lamina defines a slot for housing the constraint pin, having dimensions that allow movement of the reference support along a longitudinal axis of the elastic lamina, once the constraint pin is inserted in the provided holes.

8. The tool according to claim 1, wherein the pin defines a longitudinal slit, adapted for facilitating insertion of the pin in the provided hole on the jig or on the aircraft and an adequate force on walls of the hole provides stability and blocking of the pin in the hole.

\* \* \* \* \*